Patented Feb. 22, 1938

2,108,809

UNITED STATES PATENT OFFICE 2,108,809

MOISTUREPROOF MATERIAL AND METHOD OF MAKING THE SAME

Theron G. Finzel and Donald E. Drew, Kenmore, N. Y., assignors, by mesne assignments, to E. I. du Pont de Nemours & Company, Wilmington, Del., a corporation of Delaware No Drawing. Application June 26, 1934, Serial No. 732,443

REISSUED

19 Claims. (Cl. 91—70)

This invention relates to the manufacture of highly transparent and moistureproof paper which is admirably suitable for use as a transparent moistureproof wrapping tissue.

Prior to the instant invention, one of the common procedures for waxing paper consisted in passing the paper through a bath of molten paraffin and then thereafter setting or fixing the paraffin. The usual wax employed in these processes was of the white crystalline type of paraffin, had a refractive index substantially below that of cellulose, and resulted in films characterized by considerable haze. Thus, it was impossible to make a paraffin-impregnated paper of high transparency. One of the prior art procedures for setting or fixing the wax adhering to and in the paper comprised chilling the waxed paper by passing it through cold water. It is, however, to be noted that the immersion in cold water was not begun until after crystallization of the wax had begun. As a consequence, the paraffin film was composed of very small crystals which made it impossible for the film to be glass-clear.

The product which was obtained by the prior art procedures, in addition to being non-transparent, was furthermore characterized in that it did not possess the desired flexibility. Additionally, the surface was very easily marred or smeared upon handling.

We have found that, by treating paper of the type more fully described herein with a wax composition, the essential ingredients of which consist of a moistureproofing wax or waxy substance, a hard wax and a blending agent in the molten state and thereafter rapidly chilling the wax paper, while the wax composition is still definitely in the molten state and before any crystallization has begun, by immersing the same in cold water, we can produce a moistureproof and highly transparent paper which can be satisfactorily used as a transparent moistureproof wrapping tissue.

It is therefore an object of the instant invention to provide a transparent and moistureproof paper which is suitable for use as a transparent and moistureproof wrapping tissue.

Another object of this invention is to provide a method of producing a highly transparent and moistureproof paper.

A still further object of this invention is to provide a wax composition which, upon being rapidly chilled while it is definitely in the molten condition and before crystallization has begun, will produce a glass-clear coating which is tough, flexible, glossy, non-tacky, exhibits no tendency to stick together under ordinary weather conditions, has good surface slip, is difficultly marked or smeared by handling, and is free from greasy feel, etc.

Other objects will appear from the following description and appended claims.

As is apparent from the foregoing objects, one of the phases of the instant invention contemplates a wax composition which, when rapidly chilled, as by being immersed in cold water, while in the molten condition and before any crystallization has begun, will produce a coating which is moistureproof, glass-clear in transparency, glossy, tough, flexible, non-toxic, free from odor and taste, non-greasy, hard, difficultly marred or smeared on handling, non-tacky, possesses good surface slip, exhibits no tendency to stick together under ordinary weather conditions, is capable of being heat-sealed to a high degree, can be glued by adhesives commonly used for joining moistureproof lacquer surfaces, and can be printed, at least with special inks now used for printing moistureproof lacquer surfaces.

For the purposes of this specification and claims, we define moistureproof materials as those which, in the form of continuous, unbroken sheets or films, permit the passage of not more than 690 grams of water vapor per 100 square meters per hour, over a period of 24 hours, at approximately 39.5° C.±0.5° C., the relative humidity of the atmosphere at one side of the film being maintained at least at 98% and the relative humidity of the atmosphere at the other side being maintained at such a value as to give a humidity differential of at least 95%.

Moistureproofing coating compositions are defined as those which, when laid down in the form of a thin, continuous, unbroken film applied uniformly as a coating with a total coating thickness not exceeding 0.0005" to both sides of a sheet of regenerated cellulose of thickness approximately 0.0009", will produce a coated product which is moistureproof.

For the purposes of experimental tests, especially for those materials adaptable as coating compositions, moistureproof materials include those substances, compounds or compositions which, when laid down in the form of a continuous, unbroken film applied uniformly as a coating with a total coating thickness not exceeding 0.0005" to both sides of a sheet of regenerated cellulose of thickness approximately 0.0009", will produce a coated sheet which will permit the passage therethrough of not more than 690 grams of water vapor per 100 square meters per hour over a period of approximately 24 hours, at a temperature of 39.5° C.±0.5° C. (preferably 39.5° C.±0.25° C.), with a water vapor pressure differential of 50–55 mm. (preferably 53.4±0.7 mm.) of mercury. For convenience, the number of grams of water vapor passed under these conditions may be referred to as "the permeability value." An uncoated sheet of regenerated cellulose having a thickness of approximately 0.0009" will show a permeability value of the order of 6900.

In many cases, the moistureproofness is 20, 30, 40, 50 and up to 100 or more times better than the untreated paper.

The wax composition consists essentially of a moistureproofing wax or waxy substance, a hard wax (either vegetable or animal), and a blending agent which is generally a resin. As the moistureproofing wax, we prefer the white crystalline high melting point paraffin wax, such as one having a melting point of over 50° C., such as 52° C., 55° C., 60° C., or indeed higher. We may use the amorphous paraffins, particularly those having a high melting point, to give increased flexibility of the composition. The low melting, noncrystalline waxes, vaselines, etc., if used, will only be in very minor quantities, since they tend to decrease the moistureproofness of the product and also tend to give a product having a greasy and smeary surface.

The hard wax component imparts toughness to the composition. It also contributes greatly in producing hard, non-tacky, non-smeary surfaces as well as strong heat-sealing properties. The hard wax may be a vegetable or animal wax, and, preferably, candelilla wax or carnauba wax. These waxes are generally esters of the higher fatty acids and high molecular weight aliphatic alcohols. As additional illustrative examples may be mentioned Montan wax, palm wax, etc. as well as certain synthetic waxes of a similar nature, such as may be produced by esterifying the acids of Montan wax with the higher alcohols.

The composition of paraffin and hard waxes, while miscible well above their melting points, produce cloudy liquids or semi-solids in the region of their melting points. This condition is not avoided even by rapid chilling. The blending agent serves to prevent this separation and to inhibit the production of any haziness in the chilled composition. In other words, the blending agent primarily functions to give the rapidly chilled composition its glass-clear clarity. It may also, of course, be chosen to assist in increasing the flexibility, gloss, non-tackiness, heat-sealing, etc.

In general, as above mentioned, the blending agents are resins. As several illustrative examples of blending agents may be mentioned the common varnish or lacquer resins, such as ester gum, elemi, dammar residue or the resins from gutta percha, or some of the coal tar or anthracene-like resins or some of the synthetic resins like properly modified alkyd resins; and hydrorosinates including diethylene glycol hydrorosinate.

If desired, other constituents which serve some special purpose, such as imparting greater flexibility to the product, greater slip between adjacent surfaces, assisting the resins in preventing blushing, increasing the heat-sealing qualities, etc. may be incorporated in the composition. Rubber, gutta percha, balata, etc., when used in small quantities, impart to the product a greater flexibility and toughness, as well as greater heat-seal joint strength, when the composition is coated in thin films. Other toughening agents may be used, such as a suitable cellulose derivative (ethyl cellulose) or small quantities of film-forming resin, as vinyl acetate resins. For decreasing the tendency for blush, small quantities of substances, such as hydrogenated castor oil, paraffin oils, hydroxy fatty acids, beta-naphthol, hydronaphthalene resins, etc., may be used. Greater smoothness or slippage between adjacent surfaces is secured when small quantities of talc-like substances, such as zinc stearate, are added to the composition.

To increase the penetrating power of the compositions, particularly when they contain substances which give them increased viscosity in the molten condition, a small quantity of a volatile solvent, such as toluol or solvent naphthol, may be added to the composition. We prefer to use these solvents only in limited amount, such as is necessary to give the composition the desired fluidity and melting point, whereby it will penetrate well and/or be applied easily and readily. The amount of solvent will generally be approximately equal to the amount of the composition or less. The minimum amount of solvent is preferably used in the interest of saving solvent expense and in saving time required to eliminate the solvents from the impregnated paper.

The practical limits of the ingredients constituting the composition are as follows, the percentages being by weight:

| | Percent |
|---|---|
| Paraffin wax | 2 to 30 |
| Hard wax | 20 to 80 |
| Blending agents (resins) | 20 to 80 |

It is, of course, impossible to employ every combination of components within these ranges. Some of the combinations will not tolerate, for example, 30% paraffin. Some of the hard waxes require a much greater amount of resin to produce glass-clear films than does candelilla, but at some point within these limits a coating composition may be formulated which will, when processed in accordance with the principles of this invention, be transparent, glass-clear and possess the other desirable properties. Several illustrative compositions are given in the specific examples hereinafter set forth.

One of the characteristic features of the compositions contemplated by the instant invention is that they have an index of refraction close to that of cellulose. In general, the refractive index of the composition can be readily controlled by the kind and quantity of resins used. For example, the refractive index of the composition may be increased by additions of highly refractive resins, of which coumarone and chlorinated diphenyl resins are examples. The compositions are, furthermore, characterized in that in the molten state they have a viscosity higher than that which paraffin exhibits in the molten state. This characteristic is highly desirable when the composition is used for coating purposes. By virtue of this characteristic, it is possible to obtain a more moistureproof product than can be secured with paraffin wax, the consumption of impregnating media being substantially equal or somewhat less. For example, in transparentizing and moistureproofing paper, the very small (pinholes) and relatively wide spaces in the surface of the tissue must be completely bridged by the composition after any solvent present has been evaporated to produce a perfectly continuous film. Thus, paraffin from a melt or solution, when scraped down to a thin film on the paper surface, breaks at these pinholes with the result that the film is discontinuous. The instant compositions do not have any tendency to do this.

The compositions hereinbefore set forth are particularly suitable for transparentizing and moistureproofing thin, porous tissue paper not exceeding 0.002 of an inch in thickness, the fibers of which are inherently transparent, said paper containing no opaque sizing material nor any substances which destroy the porosity or absorptiveness of the paper to organic liquids. In the preferred embodiment of transparentizing and moistureproofing this paper, the latter is highly calendered, i. e., super-calendered, prior to the impregnation with the molten wax composition. Preferably, also, prior to the calendering operation a wetting agent is incorporated in the paper, whereby the speed of the absorption of the wax composition is increased. The highly calendered tissue paper containing the wetting agent is then impregnated with the selected composition maintained in the molten state. When impregnation is complete, the excess composition is removed in any convenient manner, as, for example, with doctor knives, to such an extent that the surface of the paper remains completely covered by a film of the molten composition. The thickness of the paper will usually be increased about 0.0003 of an inch by the layer of the wax composition. The impregnated paper is then cooled, the molten composition solidified, and the coated paper wound up.

To clarify the hazy film thus produced, the impregnated paper is passed down through a suitably selected chamber, in which the wax composition is completely melted, and then directly into a bath of water at 25° C. or below, while the composition in the paper is still completely molten, and before crystallization has begun. When the molten composition comes in contact with the water, it is very quickly solidified and so rapidly brought through its crystallization point that separation of such components as are incompatible in the melt near the crystallization point is prevented, with the result that a glossy, haze-free, transparent paper is secured. The transparent paper, after being drawn out of the water, is subjected to suitable devices or treatments which remove and/or absorb the water. Finally, the film is wound up.

The paper may be impregnated with the selected composition in many ways. The paper may be passed through the molten composition at such a speed that upon its emergence from the bath it will be completely impregnated. Instead of keeping the paper in the wax composition melt until it is thoroughly impregnated, the paper may be passed through the melt rapidly, and then impregnation allowed to proceed either before or after removing the excess melt, and finally solidifying the composition. The impregnated paper may be alternately heated and cooled until impregnation is complete.

The melt may be applied to the paper in other ways than by passing the paper through a tank thereof. It may be applied first to one side of the paper and then to the other by transfer rolls. It may be applied to both sides of the paper by means of suitable hoppers which apply in one operation the correct quantity of material necessary for the best quality of the finished product.

In many cases it is desirable to smooth out the surface of the impregnated paper after removal of the excess composition by suitable smoothing rods, brushes or polishing rolls. This is particularly so if impregnation is not thoroughly completed before the excess melt is removed. If impregnation goes on after the excess composition is removed, certain parts of the paper will absorb more melt than others and there will result a rough surface unless the surface is in some way smoothed after impregnation is complete.

The impregnated paper, after it leaves the doctor knives or smoothing rolls, and while the composition is still in the completely molten state, may be passed directly into cold water without the above-described intervening cooling operation between impregnation and clarifying. The adhering water is removed from the paper after it leaves the chilling bath by any of the known methods, as by squeeze rolls, doctors, air blasts, wiping devices, vacuum apparatus and/or various mechanical shaking devices or combinations of these devices. For example, the transparent paper may be drawn out of the water and passed first between suitable scraping bars or squeeze rollers and then over felt wiping pads which absorb the remaining drops of water. Preferably, the water is removed as quickly and as completely as possible from the coated transparent paper, since the water, if allowed to remain, will slowly penetrate the film and result in white spots in the product.

Instead of chilling the transparent impregnated papers by passage through cold water, the hot paper may be passed over positively chilled rolls.

As an additional step in our process, the finished sheet may be subjected to an atmosphere of 60% to 90% relative humidity at 40° C. to 60° C. for a sufficiently long time to replace a normal amount of moisture in the paper that may have been lost during any previous treatment in impregnation or clarification. With some compositions, the lower humidifying temperature is preferred, since temperatures high enough to melt the composition result in a blush similar to that produced when the composition is not rapidly chilled.

If solvents are used in the composition, the process includes an additional step. After removal of the excess solution, the impregnated paper is passed through a drying chamber at about 60° C. to 100° C. in which the solvent is removed. When this drying step is necessary, it is generally desirable to humidify the finished transparent paper to restore moisture lost in drying.

The compositions and procedures hereinbefore described are also equally applicable in coating sheeting of various types. They may be used for coating glassine paper or any thin, smooth, dense, non-fibrous, substantially non-porous and preferably transparent sheeting formed of a cellulosic, albuminous or other material, such as, for example, rubber or rubber derivatives. As illustrative examples of cellulosic sheeting may be mentioned sheeting coagulated or precipitated from an aqueous cellulosic dispersion or solution, for example, sheeting of regenerated cellulose, glycol cellulose, cellulose glycollic acid, lowly etherified or lowly esterified cellulose, such as lowly methylated cellulose; and sheeting of cellulose derivatives, such as celluolse acetate, cellulose nitrate, ethyl cellulose, benzyl cellulose, etc. As illustrative examples of albuminous sheeting may be mentioned gelatin and casein, hardened or not, as desired. Because of the nature of the surfaces, whereby very little impregnation is secured, a very thin coating, such as 0.00005 of an inch on each side, will give the desired result. When the base sheeting is transparent, the ultimate product will be transparent. Due to the fact that impregation is not obtained, the incorporation of the wetting agent is omitted.

Hereafter are set forth several illustrative examples of the instant invention:

Example I (A) A thin, porous sulphite tissue, basis weight between 13 pounds and 18 pounds (24 x 36—500) is treated with the following solution:

|  | Percent by weight |
|---|---|
| Ammonium oleate | 1.9 |
| Water | 21.0 |
| Denatured alcohol | 77.1 |

The excess soap solution is removed by means of squeeze rolls and the wet tissue is passed over dryer rolls, drying the tissue until it feels distinctly moist (10% to 15% moisture). The damp tissue is passed through a super-calender stack, the rolls of which are cooled. This is followed by a second super-calendering operation in which heated rolls are used. It is possible to combine these operations using a stack in which the first half of the rolls are cooled and the remainder heated. As the tissue emerges from the hot calender rolls, it is dry and has a fine finish. While its solid fraction has been increased, the calendered paper still retains a good proportion of its absorptiveness.

The soap-treated calendered paper is passed into a molten bath of the following composition:

|  | Per cent by weight |
|---|---|
| Refined carnauba wax | 34.5 |
| Glyco wax C-991 | 34.5 |
| Glyco wax B-430 | 17.2 |
| Paraffin (62° C. melting point) | 13.8 |
|  | 100.0 |

*Note:* The Glyco waxes are resinous anthracene resin-like materials manufactured by the Glyco Products Company, of Brooklyn, N. Y. C-991 is a slightly yellowish, slightly brittle resin. B-430 is a hard, brittle, light-colored resin.

The temperature of the melt should be about 90° C. After several seconds' travel through the melt, the paper is drawn up through a set of doctor knives suitably heated to prevent crystallization of the composition on them, one on each side of the paper, which scrape off all but about 15 pounds of the melt per 100 pounds of paper. The paper then passes between hot rods of small diameter which smooth out the wax surface. The impregnated paper is allowed to cool to room temperature and then wound up. At this stage of the process, the paper is thoroughly impregnated, flexible and non-tacky, but, due to the incompatibility of the slowly cooled melt component, is so badly blushed as to be practically opaque.

The blushed paper is then unwound and passed over a head roll and down through an electrically heated chamber in which the impregnated composition is thoroughly melted, but is not heated so hot as to harm the paper or to vaporize the components of the composition. While the composition is still in this molten state, the hot film is passed into a bath of water at 10° C. to 25° C. and then immediately out of the water. The contact of the film with water need be no more than one second. The paper is then passed between scraper rods which remove the greater portion of the water that adheres to the surface of the film. If the paper is running at high speed, a sheet of water is carried for some distance vertically out of the water bath on the film surface. It is desirable to break this sheet of water soon and allow the greater portion of the water to run back into the water bath, so that the small amount of water remaining on the film can form into easily removable globules on the surface of the film. After leaving the scraper rods, a portion of the remaining drops of water are blown or shaken from the film. The paper then passes between felt pads or cloth-wrapped rolls which remove the remainder of the water from the film.

The product obtained is transparent, is very clear and free from any haziness due to blushing of the composition, is free from any haze due to incomplete impregnation, is glossy and very difficultly smeared or finger-marked, is non-tacky, does not stick when stored at ordinary weather conditions in roll form or in sheets, is free from odors which would be objectionable for a food wrapper, is sealed by heat to a strong permanent joint, is moistureproof, and can be printed with inks, such as are used on lacquered moistureproof, transparent regenerated cellulose sheeting.

(B) The same calendered tissue as in Example I(A) is treated in the same fashion as in Example I(A) but using instead the following transparentizing composition:

|  | Per cent by weight |
|---|---|
| Candelilla wax | 55.5 |
| Ester gum (low melting) | 27.8 |
| Paraffin (62° C. melting point) | 16.7 |
|  | 100.0 |

If desired, the impregnated paper, after being scraped, is passed directly into a bath of cold water without the intervening cooling step, as described in Example I(A).

The transparent product obtained is in every way similar to that obtained in Example I(A), except that it is softened at a slightly lower temperature. However, it is more easily clarified by the cooling step.

(C) The same calendered tissue as in Example I(A) is treated with the following composition in the same manner as in Example I(A).

|  | Per cent by weight |
|---|---|
| Refined carnauba wax | 43.4 |
| Ester gum (low melting) | 21.7 |
| Glyco wax B-430 | 21.7 |
| Paraffin (62° C. melting point) | 13.2 |
|  | 100.0 |

Instead of cooling the molten composition impregnated in the tissue, the paper is passed over polished cold iron rolls which are hollow and which are suitably fitted for circulating cold water or brine.

A product is obtained that is transparent, clear, glossy, moistureproof and otherwise similar to that of Example I(A).

(D) The same calendered and soap-treated tissue as in Example I(A) is impregnated and cooled in the same manner as in Example I(A), using, however, the following transparentizing composition:

| | Per cent by weight |
|---|---|
| Ester gum (low melting) | 37.0 |
| Refined carnauba wax | 18.5 |
| Dewaxed shellac | 37.0 |
| Paraffin (62° C. melting point) | 7.5 |
| | 100.0 |

The product obtained is very transparent, free from haze, non-tacky, non-smeary and of very excellent flexibility.

Example II (A) The same calendered paper as in Example I(A) is impregnated with the following composition:

| | Per cent by weight |
|---|---|
| Glyco wax B-430 | 30.0 |
| I. G. Wax "E" | 30.0 |
| Ester gum | 15.0 |
| Paraffin (62° C. melting point) | 15.0 |
| Rubber (crepe) | 10.0 |
| | 100.0 |

Solvent: Toluol
Solids content: 50%

*Note:* I. G. wax "E" is a synthetic hard wax somewhat similar to carnauba wax, prepared by esterifying Montanic acid with higher aliphatic alcohols.

Paper is impregnated with the above solution and scraped as in Example I(A), except that an amount of solution is left on the paper in removing the excess such that there will be about 20 pounds of solid composition to 100 pounds of paper. In this case, the scraping knives need not be heated, since the components of the composition do not readily crystallize out of solution during the scraping operation. It is preferable that the impregnating solution be between 40° C. and 60° C. After leaving the scraping knives, the paper is passed through a drying chamber at 60° C. to 90° C. in which the toluol solvent is evaporated. The impregnated paper is then cooled and wound up and subsequently momentarily exposed to an elevated temperature and chilled as in Example I(A).

The product obtained will be transparent, very flexible and tough, and will have excellent heat-sealing properties and good slip. It will, however, tend to blush unless chilling is carried out when the composition is somewhat hotter than required in the previous example.

(B) A good 20 pound glassine (24 x 36—500) is coated with a composition of the same solid components as in Example II(A). The solvent is omitted. The solvents are not necessary in this case, since the glassine is not impregnated by such compositions and since the viscosity of the composition without the solvent is not too great for good coating.

The glassine is passed through the molten composition and the excess composition is scraped off with suitable heated knives. No time is allowed for impregnation as was the case with the calendered tissues. The coated glassine is then passed over smoothing rolls and, while the composition is still molten, is passed into cold water. The adhering water is removed and the film wound up.

The product obtained is moistureproof, glossy and somewhat improved in transparency. It is, however, slightly hazy due to imperfections in the glassine base. The wax coating is readily chilled to be free from haze, since the thickness of the composition is substantially less than that of Example II(A). The glassine base is increased in thickness about 0.00005 of an inch to 0.0001 of an inch by the coating. The coated glassine is non-tacky and non-smeary. Furthermore, it can be heat-sealed to give a very strong joint, even with the thin coating which is applied.

Example III (A) A tissue of basis weight between 13 pounds and 18 pounds (24 x 36—500) is moistened with water to about 10% to 15% moisture content by any suitable means, such as on a glassine dampener, in a suitable mist chamber or by wetting the paper and drying it down to the desired moisture content. The dampened paper may be rolled up and allowed to stand until the moisture is equally distributed. The uniformly moistened paper is calendered on hot calender rolls, during which operation it is compacted and given a smooth surface and dried down to normal moisture content. The calendered paper is then transparentized by the same composition and process as described in Example I(A).

The product obtained is moistureproof, glossy, non-smeary, of good slip, and possesses good heat-sealing properties. Its clarity and transparency will be somewhat inferior to that of Example I(A). It will have a slightly hazy appearance, that shows up as a gray cast over a black background due to somewhat poorer impregnation.

Example IV (A) A good 20 pound glassine is coated with the following composition according to the procedure outlined in Example II(B):

| | Per cent by weight |
|---|---|
| Refined carnauba wax | 66.6 |
| Diethylene glycol abietate | 26.7 |
| Paraffin (62° C. melting point) | 6.7 |
| | 100.0 |

About 5 pounds to 10 pounds of the above composition is applied to 100 pounds glassine.

The product obtained is moistureproof, glossy, non-smeary and non-tacky, and slightly improved in transparency. While the product is somewhat hazy, since the glassine base is not impregnated, the wax coating applied is glass-clear. It is essential that a thin film of the above composition be applied, since a thick film, such as would be obtained by impregnating a calendered tissue as described in Example I(A), would have a slight whitish haze even with the best rapid cooling.

(B) A film of transparent regenerated cellulose sheeting, or other transparent sheeting, such as cellulose acetate, ethyl cellulose, gelatin, etc., about 0.001 of an inch thick is coated as in Example IV(A). Between 5 pounds and 10 pounds of wax composition per 100 pounds film is applied.

The product obtained is moistureproof, glossy, non-smeary, non-tacky and glass-clear. The wax coating is tough and flexible. The film can be crumpled without chipping off portions of the coating or leaving objectionable marks or fractures in the coating.

Since it is obvious that various changes and modifications may be made in the above description without departing from the nature or spirit thereof, this invention is not restricted thereto, except as set forth in the appended claims.

We claim:

1. A method which comprises applying a moistureproofing composition in the molten state and comprising a moistureproofing wax, a hard wax and a blending agent preventing separation of the waxes and inhibiting the production of haziness in the composition when chilled to a selected base and rapidly chilling the treated base at some stage of the process when the composition is in the molten condition and before crystallization has begun, whereby a glass-clear transparent and moistureproof coating is obtained.

2. A method which comprises impregnating a thin, porous paper with a moistureproofing composition in the molten state and comprising a moistureproofing wax, a hard wax and a blending agent preventing separation of the waxes and inhibiting the production of haziness in the composition when chilled and rapidly chilling the impregnated paper at some stage of the process when the composition is in the molten condition and before crystallization has begun, whereby a transparent, moistureproof and flexible product is obtained.

3. A method which comprises incorporating a wetting agent in a thin, porous paper, calendering said paper, impregnating the thus-treated paper with a moistureproofing composition in the molten state and comprising a moistureproofing wax, a hard wax and a blending agent preventing separation of the waxes and inhibiting the production of haziness in the composition when chilled and rapidly chilling the impregnated paper at some stage of the process when the composition is still in the molten condition and before crystallization has begun, whereby a transparent, moistureproof and flexible product is obtained.

4. A method which comprises applying a moistureproofing composition in the molten state and comprising a moistureproofing wax, a hard wax and a blending agent preventing separation of the waxes and inhibiting the production of haziness in the composition when chilled to a selected base and rapidly chilling the treated base at some stage of the process when the composition is in the molten condition and before crystallization has begun by immersion in cold water, whereby a glass-clear transparent and moistureproof coating is obtained.

5. A method which comprises impregnating a thin, porous paper with a moistureproofing composition in the molten state and comprising a moistureproofing wax, a hard wax and a blending agent preventing separation of the waxes and inhibiting the production of haziness in the composition when chilled and rapidly chilling the impregnated paper at some stage of the process when the composition is in the molten condition and before crystallization has begun by immersion in cold water, whereby a transparent, moistureproof and flexible product is obtained.

6. A method which comprises incorporating a wetting agent in a thin, porous paper, calendering said paper, impregnating the thus-treated paper with a moistureproofing composition in the molten state and comprising a moistureproofing wax, a hard wax and a blending agent preventing separation of the waxes and inhibiting the production of haziness in the composition when chilled and rapidly chilling the impregnated paper at some stage of the process when the composition is still in the molten condition and before crystallization has begun by immersion in cold water, whereby a transparent, moistureproof and flexible product is obtained.

7. A method which comprises applying a moistureproofing composition in the molten state and comprising 2% to 30% of a moistureproofing waxy substance, 20% to 80% of a hard wax and 20% to 80% of a blending agent preventing separation of the waxes and inhibiting the production of haziness in the composition when chilled, the percentages being by weight, to a selected base and rapidly chilling the treated base at some stage in the process when the composition is in the molten condition and before crystallization has begun, whereby a glass-clear transparent and moistureproof coating is obtained.

8. An article of manufacture produced by the process of claim 1 comprising highly calendered, thin paper having on each side thereof a glass-clear transparent moistureproof coating consisting essentially of a moistureproofing waxy substance, a hard wax and a blending agent preventing separation of the waxes and inhibiting the production of haziness in the composition when chilled, the ingredients being present in such relative proportions as to produce a glass-clear transparent, glossy, moistureproof coating and to materially improve the transparency of the paper base.

9. An article of manufacture produced by the process of claim 2 comprising highly calendered, thin, porous paper impregnated and coated with a composition consisting essentially of a moistureproofing waxy substance, a hard wax and a blending agent preventing separation of the waxes and inhibiting the production of haziness, the ingredients being present in such relative proportions as to transparentize the paper and produce a transparent and moistureproof product.

10. An article of manufacture produced by the process of claim 3 comprising highly calendered, thin, porous paper having a wetting agent incorporated therein and impregnated and coated with a composition consisting essentially of a moistureproofing waxy substance, a hard wax and a blending agent preventing separation of the waxes and inhibiting the production of haziness, the ingredients being present in such relative proportions as to transparentize the paper and produce a transparent and moistureproof product.

11. An article of manufacture produced by the process of claim 2 comprising highly calendered, thin, porous paper impregnated and coated with a composition having an index of refraction approximately the same as cellulose and consisting essentially of a moistureproofing waxy substance, a hard wax and a blending agent preventing separation of the waxes and inhibiting the production of haziness, the ingredients being present in such relative proportions as to transparentize the paper and produce a transparent and moistureproof product.

12. An article of manufacture produced by the process of claim 3 comprising highly calendered, thin, porous paper having a wetting agent incorporated therein and impregnated and coated with a composition having an index of refraction approximately the same as cellulose and consisting essentially of a moistureproofing waxy substance, a hard wax and a blending agent preventing separation of the waxes and inhibiting the reduction of haziness, the ingredients being present in such relative proportions as to transparentize the paper and produce a transparent and moistureproof product.

13. An article of manufacture produced by the process of claim 1 comprising glassine paper having on each side thereof a glass-clear transparent moistureproof coating consisting essentially of a moistureproofing waxy substance, a hard wax and a blending agent preventing separation of the waxes and inhibiting the production of haziness, the ingredients being present in such relative proportions as to produce a glass-clear transparent, glossy moistureproof coating and to materially improve the transparency of the paper base.

14. An article of manufacture produced by the process of claim 1 comprising highly calendered, thin paper having on each side thereof a glass-clear transparent moistureproof coating consisting essentially of 2% to 30% of a moistureproofing waxy substance, 20% to 80% of a hard wax, and 20% to 80% of a blending agent preventing separation of the waxes and inhibiting the production of haziness, the percentages being by weight and the ingredients being present in such relative proportions as to produce a glass-clear transparent, glossy moistureproof coating and to materially improve the transparency of the paper base.

15. An article of manufacture produced by the process of claim 1 comprising highly calendered, thin, porous paper impregnated and coated with a composition consisting essentially of 2% to 30% of a moistureproofing waxy substance, 20% to 80% of a hard wax, and 20% to 80% of a blending agent preventing separation of the waxes and inhibiting the production of haziness, the percentages being by weight and the ingredients being present in such relative proportions as to transparentize the paper and produce a transparent and moistureproof product.

16. An article of manufacture produced by the process of claim 3 comprising highly calendered, thin, porous paper having a wetting agent incorporated therein and impregnated and coated with a composition consisting essentially of 2% to 30% of a moistureproofing waxy substance, 20% to 80% of a hard wax, and 20% to 80% of a blending agent preventing separation of the waxes and inhibiting the production of haziness, the percentages being by weight and the ingredients being present in such relative proportions as to transparentize the paper and produce a transparent and moistureproof product.

17. An article of manufacture produced by the process of claim 1 comprising highly calendered, thin, porous paper impregnated and coated with a composition having an index of refraction approximately the same as cellulose and consisting essentially of 2% to 30% of a moistureproofing waxy substance, 20% to 80% of a hard wax, and 20% to 80% of a blending agent preventing separation of the waxes and inhibiting the production of haziness, the percentages being by weight and the ingredients being present in such relative proportions as to transparentize the paper and produce a transparent and moistureproof product.

18. An article of manufacture produced by the process of claim 3 comprising highly calendered, thin, porous paper having a wetting agent incorporated therein and impregnated and coated with a composition having an index of refraction approximately the same as cellulose and consisting essentially of 2% to 30% of a moistureproofing waxy substance, 20% to 80% of a hard wax, and 20% to 80% of a blending agent preventing separation of the waxes and inhibiting the production of haziness, the percentages being by weight and the ingredients being present in such relative proportions as to transparentize the paper and produce a transparent and moistureproof product.

19. An article of manufacture produced by the process of claim 1 comprising glassine paper having on each side thereof a glass-clear transparent moistureproof coating consisting essentially of 2% to 30% of a moistureproofing waxy substance, 20% to 80% of a hard wax, and 20% to 80% of a blending agent preventing separation of the waxes and inhibiting the production of haziness, the percentages being by weight and the ingredients being present in such relative proportions as to produce a glass-clear transparent, glossy moistureproof coating and to materially improve the transparency of the paper base.

THERON G. FINZEL.
DONALD E. DREW.